US009086499B2

(12) United States Patent
Medeiros et al.

(10) Patent No.: US 9,086,499 B2
(45) Date of Patent: Jul. 21, 2015

(54) CLUSTERING PROTOCOL FOR DIRECTIONAL SENSOR NETWORKS

(75) Inventors: Henry Ponti Medeiros, West Lafayette, IN (US); Johnny Park, Lafayette, IN (US); Avinash Kak, West Lafayette, IN (US); Hidekazu Iwaki, Tokyo (JP)

(73) Assignee: Purdue Research Foundation, West Lafayette, IN (US)

( * ) Notice: Subject to any disclaimer, the term of this patent is extended or adjusted under 35 U.S.C. 154(b) by 1450 days.

(21) Appl. No.: 12/236,238

(22) Filed: Sep. 23, 2008

(65) Prior Publication Data

US 2010/0073686 A1    Mar. 25, 2010

(51) Int. Cl.
*G01S 3/786*    (2006.01)
*H04L 29/08*    (2006.01)
*G01V 8/10*    (2006.01)

(52) U.S. Cl.
CPC ............... *G01V 8/10* (2013.01); *G01S 3/7864* (2013.01); *H04L 67/12* (2013.01); *H04L 67/125* (2013.01)

(58) Field of Classification Search
USPC ........................................................ 348/143
See application file for complete search history.

(56) References Cited

U.S. PATENT DOCUMENTS

| 6,188,431 | B1* | 2/2001 | Oie .............................. 348/211.5 |
| 2006/0253570 | A1* | 11/2006 | Biswas et al. ................... 709/224 |
| 2006/0268111 | A1* | 11/2006 | Zhang et al. ..................... 348/169 |
| 2007/0279494 | A1* | 12/2007 | Aman et al. ..................... 348/169 |
| 2008/0253327 | A1* | 10/2008 | Kohvakka et al. ............. 370/330 |
| 2011/0211096 | A1* | 9/2011 | Aagaard et al. ................. 348/262 |

OTHER PUBLICATIONS

Yi et al., "Passive Clustering in Ad Hoc Networks (PC)", Nov. 14, 2001, pp. 1-31.*
Len et al., "A Novel K-hop Cluster-based Location Service Protocol for Mobile Ad Hoc Networks", 2006, pp. 1-6.*
Medeiros, H., Park, J., & Kak, A. (Sep. 25-28, 2007). A light-weight event-driven protocol for sensor clustering in wireless camera networks. In *Distributed Smart Cameras, 2007. ICDSC'07. First ACM/IEEE International Conference* on (pp. 203-210). IEEE.
Rahimi, M., Baer, R., (Feb. 2005). Cyclops, image sensing and interpretation in wireless sensor networks. Preliminary Documentation for Cyclops 1.0. Agilent Corporation, The Regents of the University of California, 19 pages.

* cited by examiner

*Primary Examiner* — Angela Nguyen
(74) *Attorney, Agent, or Firm* — Barnes & Thornburg LLP

(57) ABSTRACT

A method and apparatus for tracking target objects includes a network of unidirectional sensors which correspond to nodes on the network. The sensors identify the presence of a target object, determine a first criteria for the relationship of the target object to the sensors and send a message to sensors neighboring the sensor. The message includes a unique identification of the target object and the first criteria. The sensors are ranked to determine which of the sensors should head a cluster of sensors for tracking the target object. Clusters are propagated and fragmented as the target object moves through a field of sensors.

19 Claims, 16 Drawing Sheets

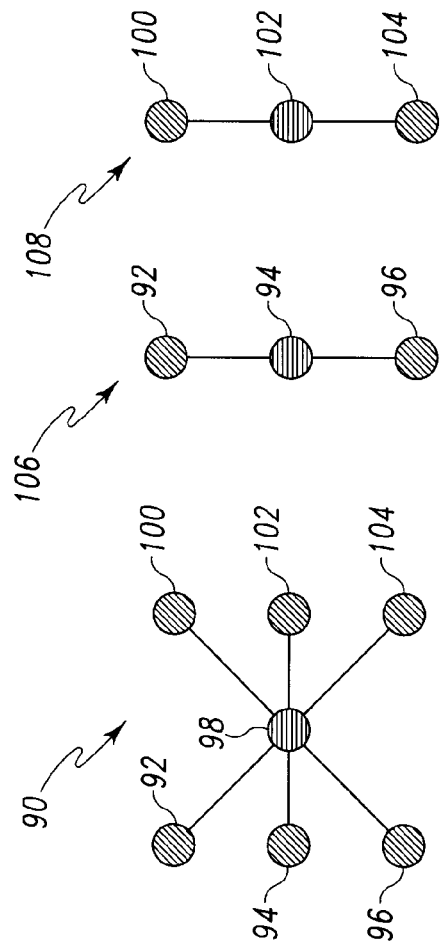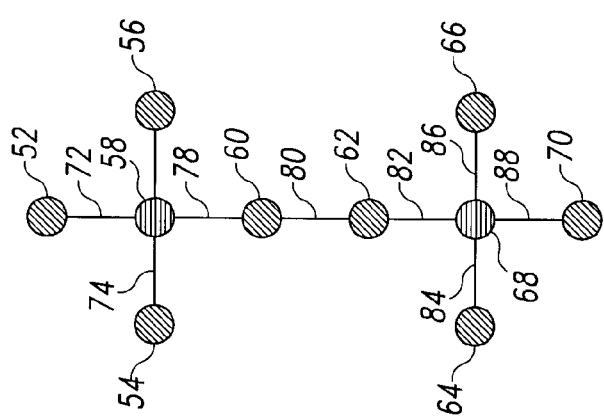

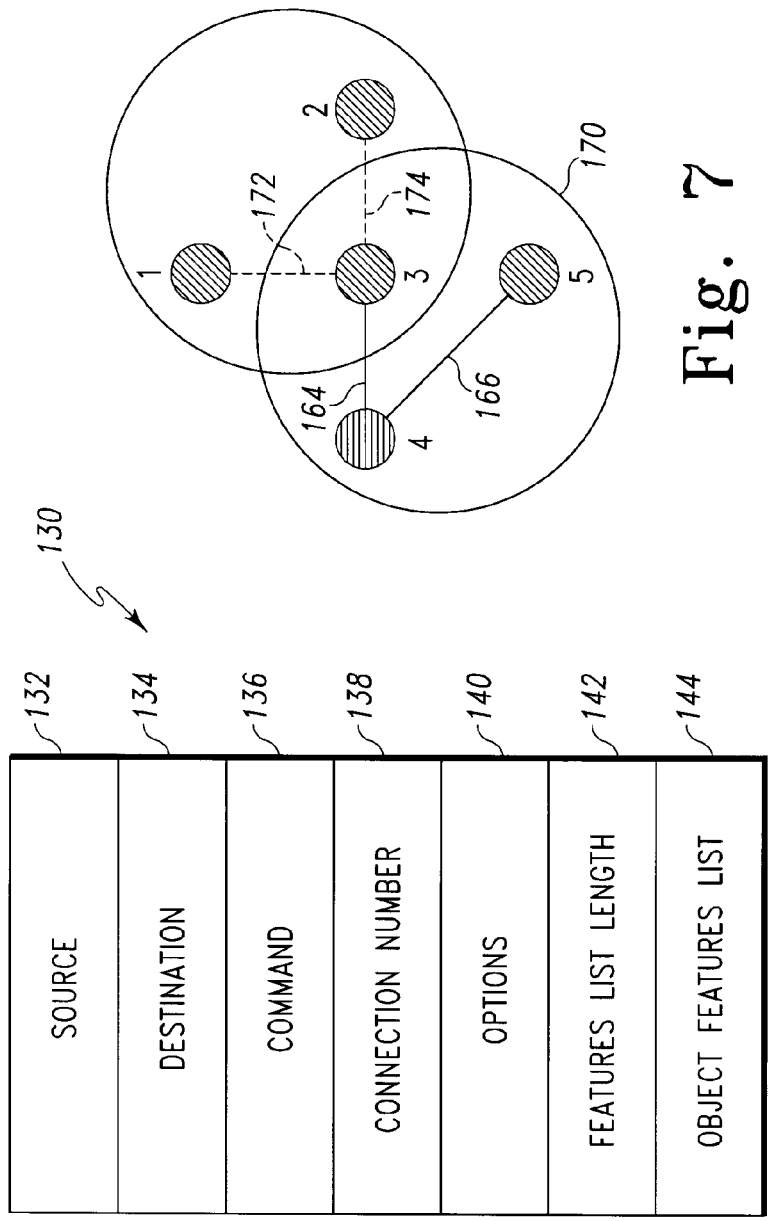

CLUSTERING PROTOCOL FOR DIRECTIONAL SENSOR NETWORKS

BACKGROUND OF THE INVENTION

The present disclosure is related to sensor clustering in networks. More specifically, the present disclosure is related to clustering of wireless cameras in a network for tracking objects that move through the respective fields of vision of the cameras.

In event driven sensor clustering, it is necessary to select a subset of a group of sensors which provide data about the event source. Various sensors in the network must communicate to share information about the event to establish useful information regarding the event. While some sensors may provide useful information, not all sensors in the group provide useful information all of the time. For example, a sensor may not be positioned to detect the event.

In order to minimize the processing resources necessary to track the event, it is known to establish a cost function to select the appropriate subset of sensors so that useful information is maximized while the cost of resources to process the information is minimized. In the case of omnidirectional sensors, such as microphones for example, clustering of subsets of sensors relies on the known physical relationship between the sensors to evaluate event-generating target information for the cost function. The position and spacing between the sensors defines a relationship which is considered in the cost function algorithm.

In the case of directionally limited sensors, such as cameras, for example, position and distance based criteria for the sensors may be of limited value in evaluating the cost function. The cost of carrying out a given task depends on the amount of energy required by a set of sensors to process the information and the amount of communication traffic generated during this process. In directional sensors, the cost is associated with the relative orientations of sensors that are able to collaboratively carry out the same task. Proximal sensors may sense segments of space that are disjointed or spaced apart from one another.

SUMMARY OF THE INVENTION

The present application discloses one or more of the features recited in the appended claims and/or the following features which, alone or in any combination, may comprise patentable subject matter:

According to one aspect of the disclosure, a method of tracking target objects in a network of unidirectional sensors which correspond to nodes on a network comprises identifying the presence of a target object by a first unidirectional sensor, determining a first criteria for the relationship of the target object to the first unidirectional sensor and sending a message to at least one second unidirectional sensor which is a neighbor to the first unidirectional sensor. The message includes a unique identification of the target object and the first criteria. The method further comprises the step of the first unidirectional sensor monitoring messages from at least one second unidirectional sensor. A second unidirectional sensor sending a message that includes a second criteria indicative of the relationship of the target object to the at least one second unidirectional sensor. The method further comprises the step of ranking the first criteria and second criteria. The method further comprises the step of the first unidirectional sensor utilizing the ranking of the first and second criteria to determine whether to elect itself the head of a cluster including at least the first unidirectional sensor or join a cluster headed by another unidirectional sensor.

In some embodiments, the method further comprises the step of propagating the cluster through the network of sensors by adding an additional sensor which is a sensor in single hop communication with the current cluster head to the cluster upon identification of the target object by the additional sensor. The step of propagating the cluster through the network may comprise dropping a sensor from the cluster upon loss of contact with the target object by the sensor. The step of propagating the cluster through the network may still also comprise fragmenting a first cluster into multiple clusters when the cluster head of the first cluster loses contact with the target object.

In some embodiments, the step of identifying a target object comprises identifying a unique characteristic of an object in the range of the sensor. For example, in some embodiments, the sensors are cameras and the unique characteristic of the object is a color histogram.

In some embodiments, the sending of a message comprises broadcasting a message to all neighboring sensors. In some embodiments, the sensors communicate wirelessly.

In another aspect of the present disclosure, a method of tracking a target object in a network of unidirectional sensors which correspond to nodes on a network comprises the formation of a plurality of clusters of sensors tracking the target object, each cluster having a respective single sensor node as a head of each respective cluster and any sensor nodes in the cluster that are not cluster heads are in single hop communication with the head of the cluster to which they join. The method further comprises communicating between clusters to share information between the clusters regarding the location of the target object.

In some embodiments, at least two clusters are positioned such that a sensor node of a first cluster borders a sensor node of a second cluster and the communication between the clusters is accomplished by sharing of information between the bordering sensor nodes. In some embodiments, the sensor nodes communicate wirelessly. In some embodiments, the sensor nodes comprise cameras. The method may comprise a step in which a first sensor node that fails to communicate to a second sensor node that is head of the cluster to which the first and second sensor nodes belong results in the termination of the first sensor node from the cluster.

In yet another aspect of the present disclosure, a system for tracking a target object comprises a plurality of unidirectional sensors, and a plurality of communication devices. Each communication device is associated with a respective unidirectional sensor, the plurality of communication devices is configured to form a distributed network. The system further comprises a control system configured to (i) receive information from one or more of the unidirectional sensors, (ii) process the information from the one or more unidirectional sensors to identify a characteristic of a target object, and (iii) form a cluster of unidirectional sensors positioned to sense the target object, the cluster sharing data from each of the sensors in the cluster to monitor the position of the target object.

In some embodiments, the control system is further configured to form a plurality of clusters of unidirectional sensors positioned to sense the target object, each cluster sharing data from each of the sensors in the cluster to monitor the position of the target object. In some embodiments, the communication devices communicate wirelessly.

In some embodiments, a first communication device sends a broadcast message to all of the communication devices in single hop communication with the first communication device when the sensor associated with the first communication device detects a target object. The broadcast message may include (i) information regarding an identifying characteristic of the target object and (ii) information regarding the position of the target object relative to the sensor associated with the first communication device.

In some embodiments the first sensor identified as having a position in the first sensor sensing area closest to the target object relative to the sensors having communication devices in single hop communication with the communication device associated with the first sensor is designated the head of a cluster of sensors. In some embodiments, the plurality of clusters share information regarding the position of the target object with each cluster sharing information with an adjacent cluster through a communication devices in single hop communication between the clusters.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIG. 2 is a diagrammatic representation of a grouping of network nodes grouped into clusters;

FIG. 3 is a diagrammatic representation of a network of nodes grouped into a single cluster;

FIG. 4 is a diagrammatic representation of the network of nodes of FIG. 3 after a cluster head has left the cluster and the network has fragmented into two clusters;

FIG. 6 is a diagrammatic representation of a data included in a message sent by sensors in a network;

FIG. 7 is a diagrammatic representation of the relationship of various nodes on a network;

DETAILED DESCRIPTION OF THE DRAWINGS

Figure 1:
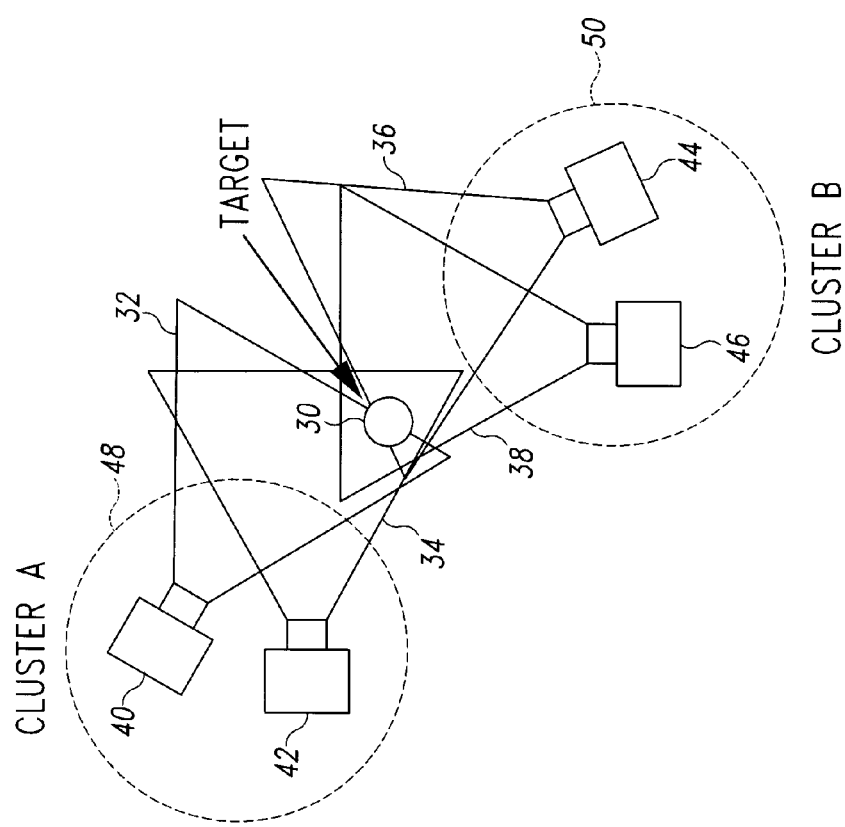
FIG. 1 is a diagrammatic representation of a network of sensors.

A method of tracking an object 30 as it moves through the respective fields of view 32, 34, 36 and 38 of multiple sensors illustratively embodied as cameras 40, 42, 44, and 46, as shown in FIG. 1, utilizes an algorithm to form clusters. In the illustrative embodiment of FIG. 1, a first cluster 48 is formed by cameras 40 and 42 and a second cluster 50 is formed by cameras 44 and 46. As the object 30 moves through multiple fields of view, such as fields of view 32, 34, 36 and 38, for example, the algorithms of the present disclosure are operable to transfer tracking responsibility from camera to camera and cluster to cluster to maintain information about the position of the object 30. It should be understood that any of a number of cameras may be used within the scope of the present disclosure.

A generalized communications diagram of the relationship between multiple cameras is shown in FIG. 2. As shown in FIG. 2, a group of ten cameras 52, 54, 56, 58, 60, 62, 64, 66, 68 and 70 each detect a target (not shown). The communications links 72, 74, 76, 78, 80, 82, 84, 86 and 88 between the cameras 52, 54, 56, 58, 60, 62, 64, 66, 68 and 70 allow all of the cameras 52, 54, 56, 58, 60, 62, 64, 66, 68 and 70 to share information about the position of a target. In the system of FIG. 2, cameras 58 and 68 are each designated cluster heads based on the collective information from all of the cameras 52, 54, 56, 58, 60, 62, 64, 66, 68 and 70. However, information shared between camera 52 and 70, for example, must occur in multiple hops, thereby driving significant processing overhead. Through dynamic clustering, a significant reduction in the processing overhead required may be realized. For example, cameras may be grouped into clusters and cluster level object tracking information may be shared without the need for multiple hop communications between cameras.

As will be discussed in detail below, according to the present disclosure, each cluster has a separate head which is in single hop communication with all of the other cameras in the cluster. Through cluster propagation, new cameras who detect a target are added to a single hop cluster and members who no longer see the target are dropped. During propagation, cluster heads which leave the cluster are replaced with new cluster heads. As shown in FIG. 3, a single cluster 90 includes multiple cameras 92, 94, 96, 98, 100, 102, 104. The camera 98 is the cluster head of the cluster 90. As camera 98 loses sight of the target being tracked by cluster 90, the camera 98 drops from the cluster 90. As such, cluster 90 is dissolved. As shown in FIG. 4, the former cluster 90 has been dissolved and two new clusters 106 and 108 are formed from the remaining cameras 92, 94, 96, 98, 100, 102, 104. It should be noted that new cluster heads 94 and 102 of clusters 106 and 108 are in single hop communication with the other cameras in the respective clusters.

The present disclosure contemplates that disparate clusters may coalesce into a single cluster. In FIG. 4, if clusters 106 and 108 are in existence and the target tracked moves within the view of camera 98, clusters 106 and 108 may be merged into a single cluster, such as cluster 90 in FIG. 3, with camera 98 taking the role of the unitary cluster head.

Figure 5:
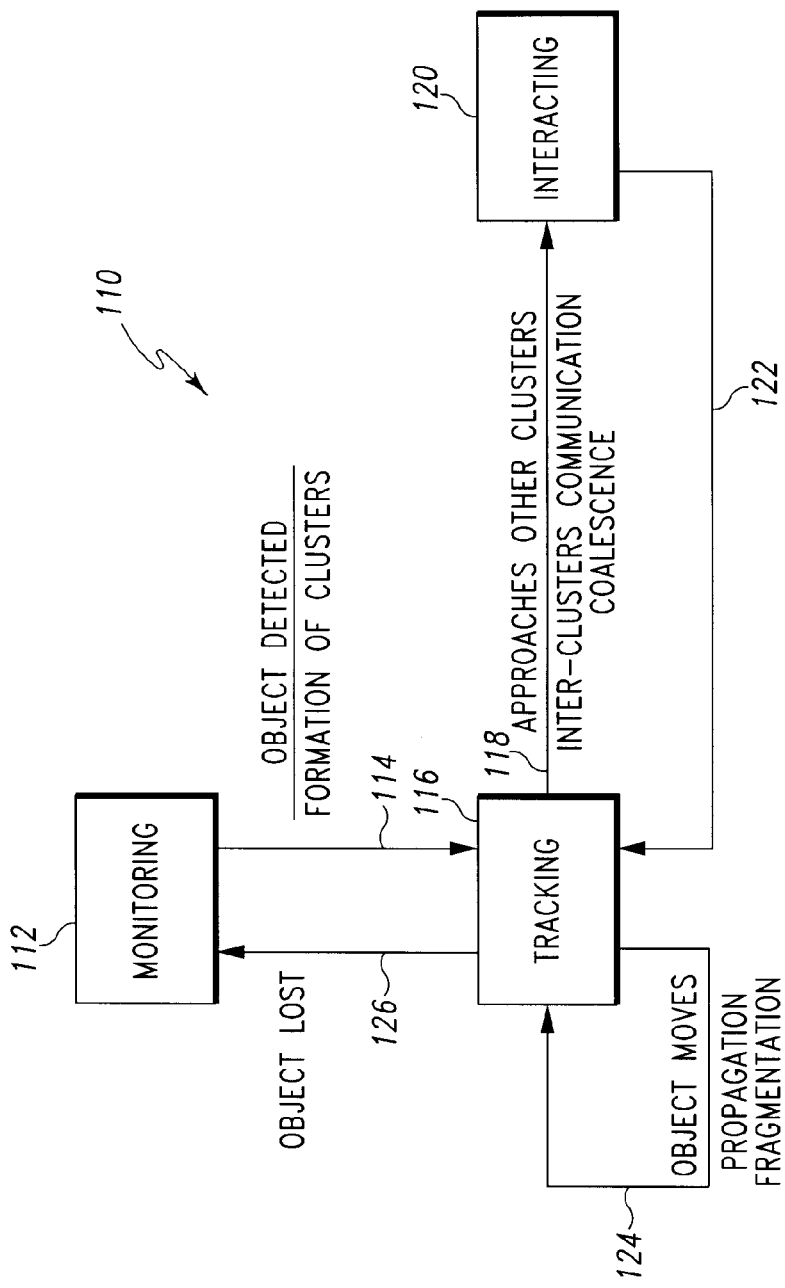
FIG. 5 is a state transition diagram for an object tracking system.

The process of cluster formation, dissolution, and propagation is presented as a state diagram 110 in FIG. 5. In a monitor state 112, an object tracking system monitors the data from various cameras until a target object is detected. Once the target object is detected, the state of the system is altered and clusters are formed as represented by transition 114. Once initial cluster(s) are formed, the system enters the tracking state 116. In tracking state 116 intra-cluster communications provide for tracking of the target object by individual clusters. The cluster(s) communicate with other cluster(s) as indicated at transition 118. The communication at transition 118 is designated as inter-cluster communication and the transfer of data is represented at interacting state 120. This interaction may result in coalescence of disparate clusters into larger clusters. Once the interaction is complete, the state of the system transfers back to the tracking state 116 as represented by transition 122. During target object movement, the intra-cluster communication may result in the propagation or fragmentation of clusters as represented by transition 124. Once the object being tracked is lost, the system transitions from the tracking state 116 to the monitoring state 112 as represented by transition 126. It should be understood that in a system in which multiple target objects are being tracked, the state of the system with regard to any particular target object may be different from the state of other target objects being tracked. As such, an individual camera may be associated with multiple clusters and a separate state diagram could be expressed for each of the target objects.

When the various cameras in a system are placed together in a network, each camera corresponds to a node on the network. For example, a peer-to-peer network permits information to be shared to all nodes. However, the present disclosure contemplates that the peer-to-peer network will dynamically develop cluster heads which serve as local master nodes. Intra-cluster communications are handled by the cluster head and inter-cluster communications are handled by the various cluster heads through single hop communications between border nodes on the adjacent clusters.

An illustrative embodiment of a message format 130 for communication between nodes is shown in FIG. 6. Each message includes an identification of the source node 132 and an address for the destination node 134. In some cases, the destination address 134 may be a broadcast address so that the message 130 is delivered to all of the nodes. A command 136 is included in the message. The command 136 is a particular command of the protocol which is sent based on protocol criteria. A connection number 138 corresponds to a unique number defined by a cluster head to identify a connection to exchange information about a target object. The message format 130 also includes an options field 140 with command-specific information such as cluster head selection criteria. The features list length 142 portion of the message informs the receiving node(s) as to the size of the features list 144 so that the feature(s) used to define a target object being tracked may be identified. The features list 144 includes the various visual object features used by the system to uniquely identify a particular target object. Depending on application of the system, the features list may include data regarding the object shape, size, and/or color.

Figure 8:
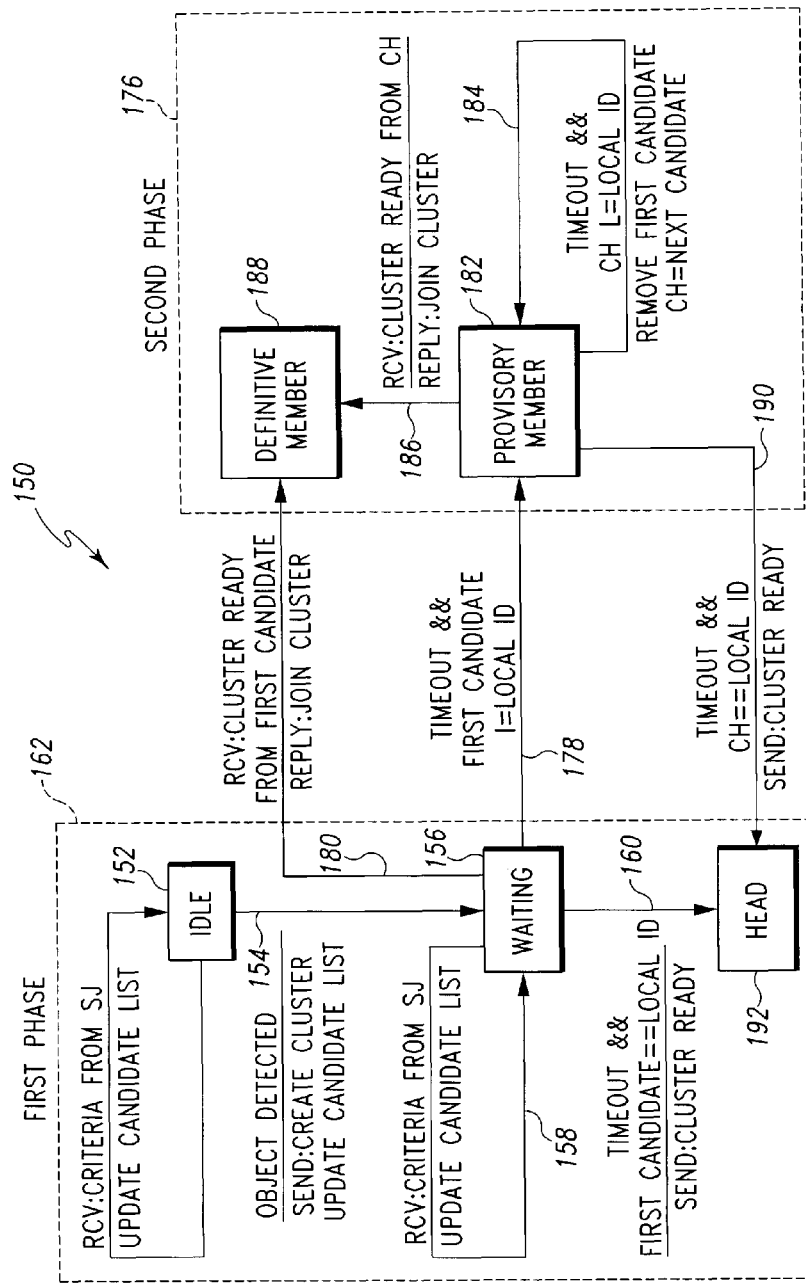
FIG. 8 is a state transition diagram for a two phase cluster head election algorithm in a sensor network.

Once a target object has been identified in the monitoring state 112 of state diagram 110 in FIG. 5, the process of electing cluster heads 150, shown in FIG. 8, is initiated at an idle step 152. Upon detection of a target object a first camera sends a "create cluster" message at transition 154. Upon the determination that a target object has been detected, the first camera node determines a criterion which provides a ranking of the node as a cluster head. In the illustrative embodiment, the criterion is the distance between the camera center and the object center in the image plane. In general, under this criteria the camera node with the smallest distance will elect itself a node head. While in the illustrative embodiment the distance between the camera center and the object center in the image plane is a cluster head selection criteria, other selection criteria may be employed depending on the purpose and the needs of the system and the scope of the head selection criterion should not be limited to only the criteria disclosed herein.

Upon sending the cluster creation message at 154, the first camera node enters a waiting state 156 in which the first camera node monitors messages from other camera nodes. While in the waiting state 156, the first camera listens for cluster creation messages from other cameras and updates the cluster head candidate list as depicted by process 158. Each cluster creation message prompts the first camera to update the list of cluster head candidates. Those cameras which neighbor the first camera but have not yet detected an object also create a cluster head candidate list based on the information from neighboring camera nodes. This prevents the cameras which identify the object later from losing information regarding potential cluster head candidates.

If at the end of the predefined waiting period the first camera finds that it is in the first position of cluster head candidates, the first camera sends a message to neighboring cameras informing the neighboring cameras that it is ready to become the cluster head as indicated at process 160. Upon completion of the first phase 162, at least one camera node in a single hop neighborhood will designate itself as a cluster head. For example, as shown in FIG. 7, camera 4 is in single hop communication with camera 3 through link 164. The camera 4 of FIG. 7 is also in single hop communication with camera 5 through link 166. However, cameras 1 and 2 are not in single hop communication with camera 4. In FIG. 7, camera 4 is elected cluster head of cluster 170. Because cameras 1 and 2 are not in single hop communication with camera 4, they are not able to join cluster 170. In the illustrative example of FIG. 7, each of cameras 1 and 2 are in single hop communication with camera 3 through links 172 and 174 respectively. Based on the cluster formation messages sent, cameras 1 and 2 would choose to join a cluster headed by camera 3, but camera 3 has joined cluster 170 with camera 4 as a head as represented by a process 180 of FIG. 8, whereby camera 3 becomes a definitive member 188 of the cluster 170. Because camera 3 has joined cluster 170, cameras 1 and 2 are orphaned.

Cameras 1 and 2 must then proceed to a second phase of process 150 through process 178 to a provisory member state 182. In the provisory member state 182, an orphaned camera, such as the cameras 1 and 2 of the example of FIG. 7, remove the first camera from the cluster head candidates list and determine the next best cluster head candidate as represented by process 184. If the orphaned camera finds itself in the first position on the cluster head candidate list, then the orphaned camera sends a message to neighboring camera nodes at process 190, informing the neighboring cameras that the orphaned camera is ready to be a cluster head and enters the cluster head state at 192.

If the orphaned camera is not the first candidate on the updated list at state 182, then the orphaned camera enters a waiting period in which the orphaned camera waits for a message from the current first candidate in the cluster head list of the orphaned camera. If the orphaned camera receives a cluster ready message from the current first candidate during the waiting period, then the orphaned camera joins the cluster of the new candidate as represented by process 186 and enters a definitive member state 188. Should the orphaned camera not receive a cluster ready message from the current first candidate, then process 184 is iterated and the orphaned camera either assumes headship of a cluster or again waits for a message from a next head candidate. The process 184 is iterated until the orphaned camera joins a cluster or becomes a cluster head.

To maintain robustness, it is necessary that the head election criteria impose a strict ordering to the candidates such that there are no ties. For example, it is possible that if two or more camera nodes have the same selection criteria, the node with the latest or most recent in time cluster ready message be elected the head. Once clusters are formed, cameras no longer receive cluster ready messages from other cameras with regard to a particular target object. Cameras may continue to receive messages and form clusters for other target objects as, according to the present disclosure, multiple objects may be tracked through a system of cameras.

It should be noted that the process 150 is not completely robust in the face of communication failures. However, the lack of robustness is mitigated because eventually each camera will elect a cluster head even if the camera defaults to itself as its own cluster head. Thus, the simplicity of the algorithm overcomes the lack of robustness in the face of communication failures.

Once cameras detecting a target object have formed a group of clusters tracking the target object, each cluster head assumes responsibility for the intra-cluster communication and operations for the cluster members within the cluster of the head. While it is not strictly required that the cluster head knows about cluster members, in a collaborative system the cluster head must assign tasks to members and coordinate distributed processing.

Once the clusters are initially formed, the clusters actively propagate and dissolve as the target object is tracked and visibility is lost. Propagation of a cluster involves the addition and removal of cluster members as well as reassignment of the cluster head position.

Figure 9:
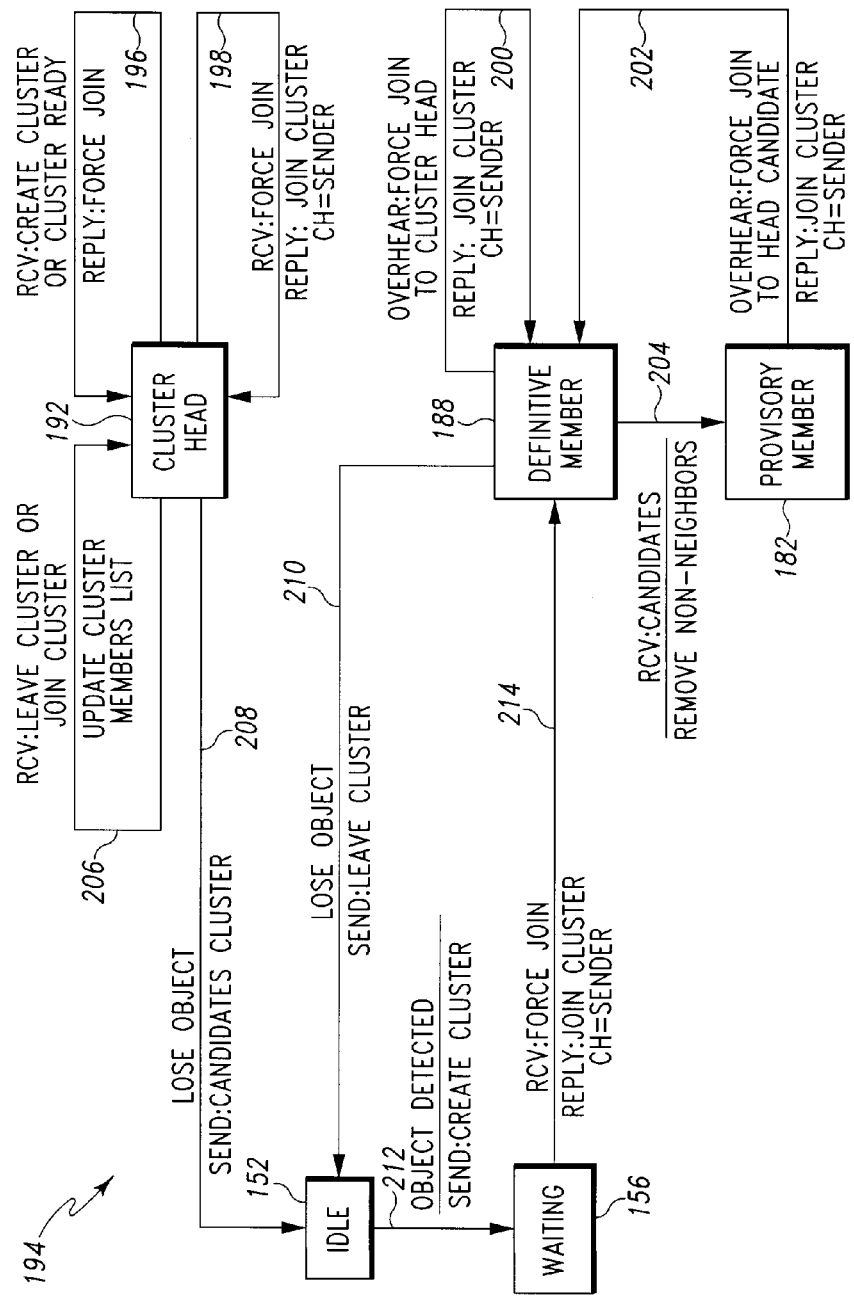
FIG. 9 is a state transition diagram for cluster propagation in a sensor network.

Referring now to FIG. 9, the process for cluster propagation is shown at 194. A new camera in the idle state 152 who detects a target object sends a create cluster message at process 212 and enters the waiting state 156 similar to the cluster formation process 150. However, when a cluster in the neighborhood of the new camera is already tracking the target object detected by the new camera, the cluster head receives the create cluster message at process 196 and replies to the new camera with a request to join the existing cluster. The new camera replies with a join cluster message at process 214 and enters the definitive member state 188. If there are multiple cluster heads in the neighborhood of the new camera, the new camera simply joins the cluster of the cluster head that responds first. This prevents the need for additional time delay for the new camera to determine which cluster head is closest to the new camera. This reduces the potential degradation of tracking performance associated with the time delay and the cluster head that first responds will update the tracking information with the information from the new camera so that he system will collectively have the additional data provided by the new camera.

If a camera is in a definitive member state 188, the camera simply sends a leave cluster message to the cluster head as designated by process 210. The camera then transitions to the idle state 152. When the cluster head receives the leave cluster message it updates the cluster members list as represented by process 206.

The process of cluster fragmentation involves the separation of a single cluster into multiple clusters as, for example, depicted in the transition from FIG. 3 to FIG. 4. Upon fragmentation, new cluster heads must be established for the newly fragmented clusters. When a cluster head determines that it has lost contact with the target object, the cluster head sends a complete candidate list of ranked cluster head candidates to all of the other camera nodes in the cluster as depicted at process step 208 in the process 194 and the cluster head returns to the idle state 152. The cluster head maintains the ranked list during the time that the cluster is in operation based on the position (or other criteria) data provided by the cluster members. When fragmenting cluster members who are in the definitive member state 188 receive the candidates list from the cluster head, the various members remove candidates who are not neighbors as depicted in process step 204 and the various members enter the provisory member state 182 electing a cluster head as described in the second phase 176 of process 150.

Multiple clusters may coalesce to consolidate the multiple clusters into a single cluster. When two clusters propagate toward each other, a candidate for cluster head of the first cluster may be a neighbor to a cluster head for a second cluster. If the cluster head criteria favor the cluster head of the second cluster, the candidate for cluster head of the first cluster will be forced to join to the cluster head of the second cluster. Those members of the first cluster that are not in single hop communication with the head of the second cluster will be forced into the provisory member state 182 and join or form a cluster as described in the second phase 176 of process 150.

Figure 10:
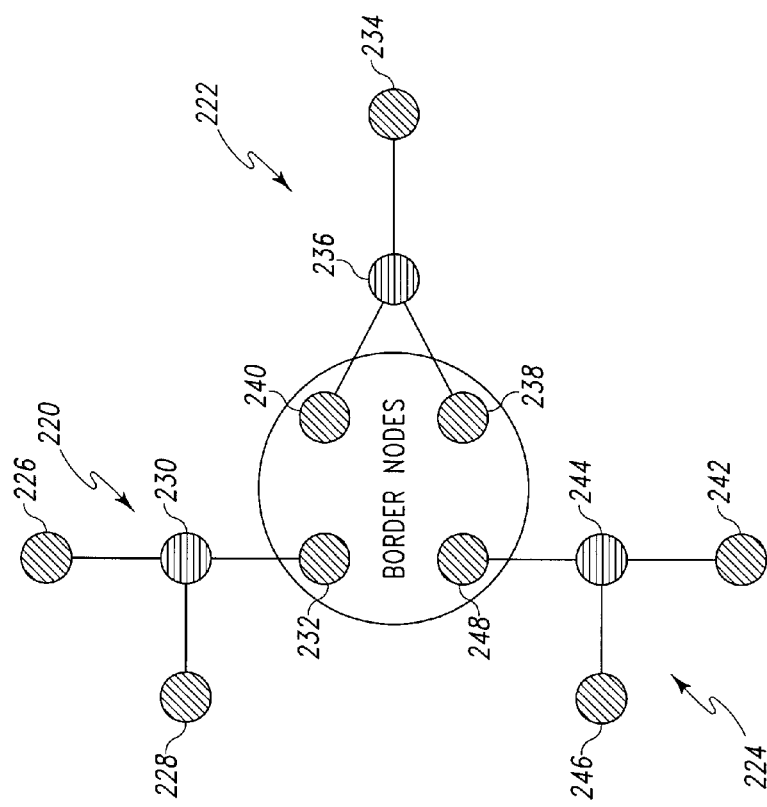
FIG. 10 is a diagrammatic representation of the relationship of adjacent clusters of nodes which communicate through border nodes.

In addition to the tracking of target object through cluster propagation, fragmentation, and coalescence, the tracking system may share inter-cluster information to track the target object. The establishment of communication between clusters is made through border nodes. A border node is a node which is in single hop communication with a head of its cluster and in single hop communication with a member of a different cluster. Thus, a first border node of a first cluster is a neighbor to a border node of a second cluster. Referring to FIG. 10, three clusters 220, 222 and 224 are shown. The cluster 220 includes nodes 226, 228, 230, and 232 with 230 serving as the cluster head. The cluster 222 includes nodes 234, 236, 238 and 240 with node 236 serving as the cluster head. Also, the cluster 224 includes nodes 242, 244, 246 and 248 with node 244 serving as the cluster head. The node 240 of cluster 222 is in single hop communication with the node 232 of cluster 220. Likewise, the node 238 of cluster 222 is in single hop communication with node 248 of cluster 224. Node 248 is also in single hop communication with node 232 of cluster 220.

Figure 11:
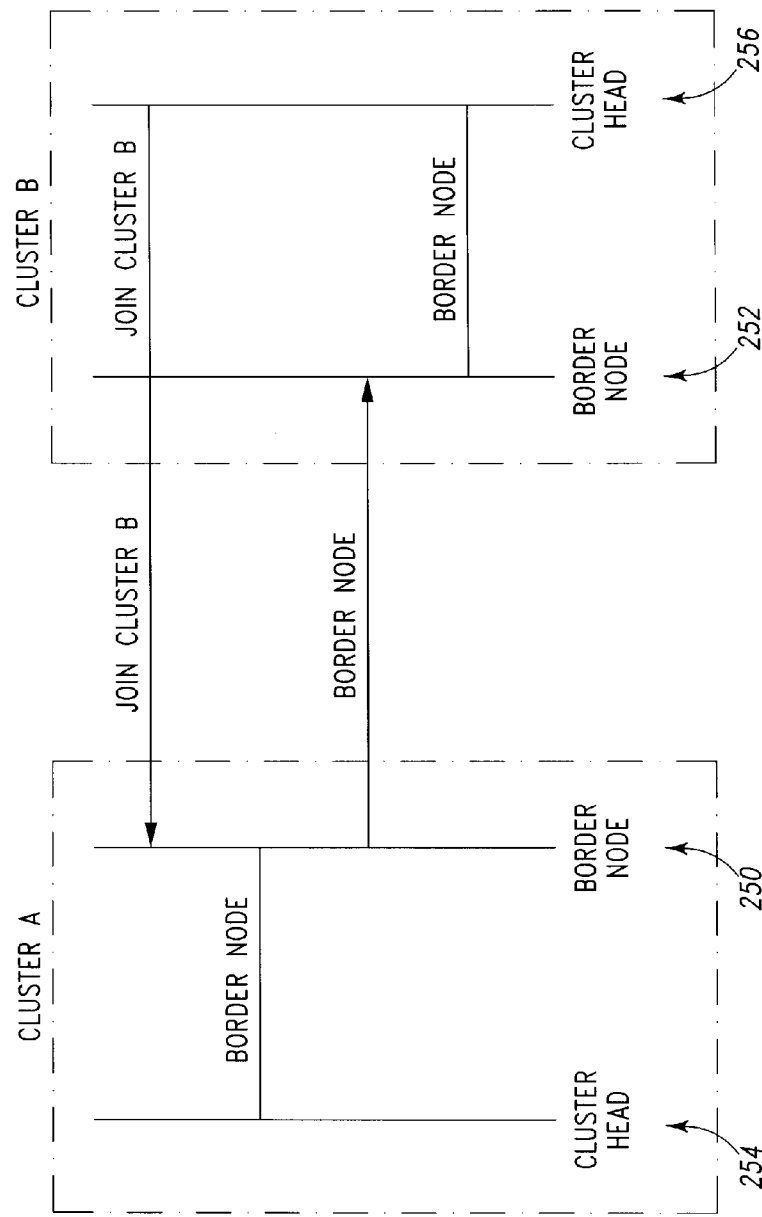
FIG. 11 is a diagrammatic representation of the messages transmitted between border nodes of adjacent clusters to establish inter-cluster communication.

Because a node in single hop communication overhears messages from the neighboring nodes, each of the nodes 232, 238, 240 and 248 overhear that the respective neighbors have joined a different cluster. Illustratively, node 240 overhears that node 232 has joined cluster 220. The node 240 then communicates to the cluster head 236 that it is a border node and privy to messages from an adjacent cluster. Also, the node 240 informs node 232 that they are border nodes so that node 232 can inform the cluster head node 230 of cluster 220 that there is a border relationship established. This communication is generalized in the state-space diagram shown in FIG. 11 where a generalized border node 250 of a cluster A receives a message from a border node 252 that has joined a cluster B. The border node 250 of cluster A informs the border node 252 of cluster B of the border node status as well as informing the cluster head 254 of cluster A. In turn, border node 252 informs the cluster head 256 of cluster B of the border node relationship between the clusters A and B. Once the border node relationship is established, the cluster head of cluster A can request information from cluster B which may assist in the tracking of a target object.

Figure 12:
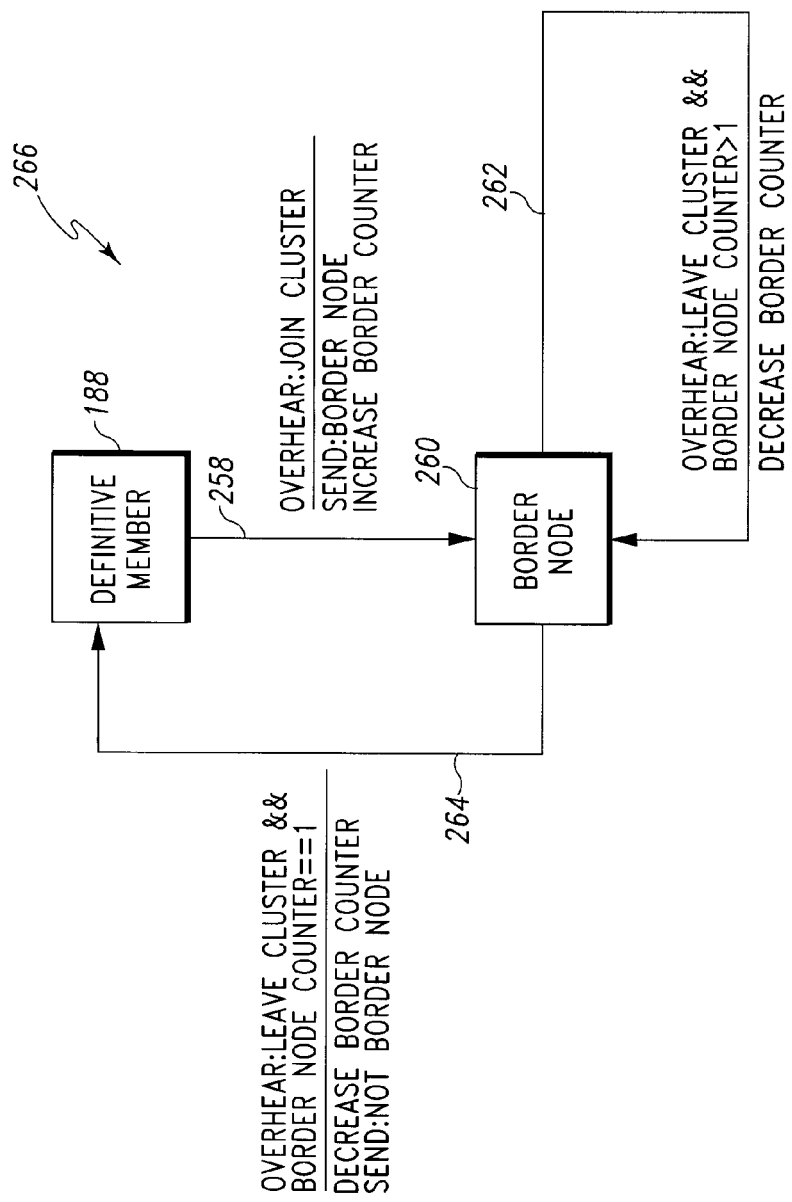
FIG. 12 is a state transition diagram for the communication between adjacent clusters.

As noted above, node 248 of cluster 224 is a border node to both the node 238 of cluster 222 and the node 232 of cluster 220. Thus, cluster 224 is able to request information from both cluster 220 and 222 to assist in the tracking process. The management of border node relationships is diagrammed in the state diagram of FIG. 12 in which the process for monitoring border node relationships 266 is presented. A camera in a definitive member state 188 which overhears a join cluster message from a neighboring camera node follows a process step 258 and whereby it sends a message to the head of the cluster the camera belongs to, increments a border node counter, and transitions to the border node state 260. If a camera is in the border node state 260 and overhears a leave cluster message from a neighbor the border node will decrement the border node counter. If the border node counter is greater than 1, the camera follows process step 262 and continues in the border node state 260. If the border node counter is equal to 1, the camera will follow the process step 264 whereby it will decrease the border node counter to zero and transition to the definitive member state 188.

The dynamic relationship of the tracking system provides a robust system in the event of communication failures between nodes. The periodic exchange of messages between nodes due to collaborative processing provides a periodic refresh of the cluster status. In order to achieve collaborative processing, the cluster heads and cluster member nodes exchange messages on a regular basis. The receipt of messages provides confirmation of cluster status for the nodes in the cluster. Should a node, such as a cluster head, not receive a message from a cluster member in a designated time interval, the cluster head considers the cluster member out of communication to have terminated the membership in the cluster. Likewise, if a cluster member does not hear from a cluster head in a designated time interval, the cluster member considers the cluster to be dissolved and the cluster member begins the process of creating its own cluster.

In the illustrative embodiment, the cluster members and the cluster heads communicate on a multi-directional basis sharing information and collaboratively processing data. A soft-state procedure may be employed for maintenance of cluster relationships in system which requires unidirectional communication from the cluster head to the cluster members. For example, if an application requires communication only from the head to the members or members to the head, then a periodic refresh message can be sent from the receiver to confirm the cluster relationships.

This same soft-state approach may be used in the communication between border nodes. If a border node does not hear from nodes outside its own cluster for a predefined time interval, it assumes that it is no longer a border node with respect to the particular relationship lost. If communication is unidirectional, border nodes can overhear the refresh messages sent by the neighboring clusters' border nodes to the neighboring cluster heads.

The clustering protocol of the present disclosure was illustratively embodied in a test bed including twelve Cyclops cameras from Agilent Technologies, Inc. of Santa Clara, Calif. The cameras are attached to MicaZ motes, part number MPR2400CA, available from Crossbow Technology, Inc. of San Jose, Calif. to form a node on the network. Thus, each node comprises a sensor, illustratively a camera, and a communication device, illustratively a mote. The motes cooperate to form a wireless radio frequency network. The software runs under the TinyOS 1.15 operating system. All of the programming of the illustrative embodiment was implemented using the nesC programming language.

Figure 13:
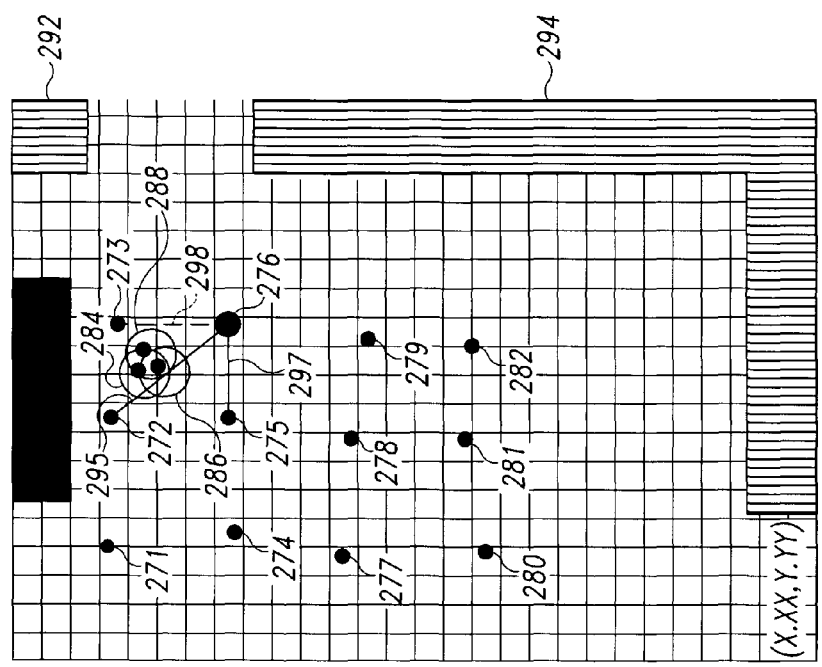
FIG. 13 is a diagrammatic representation of a graphical user interface of a network of sensors for tracking an object.

A diagrammatic representation of the layout of the cameras is shown in FIG. 13. The field of view of all the cameras covers a region of about 16 feet by 12 feet. The cameras were calibrated by the calculation of planar relationships between the floor of the laboratory and the camera planes. As the object to be tracked moves on the floor, each camera that sees the target is able to compute the coordinates of the centroid of its image with respect to the world coordinate frame.

Figure 20:
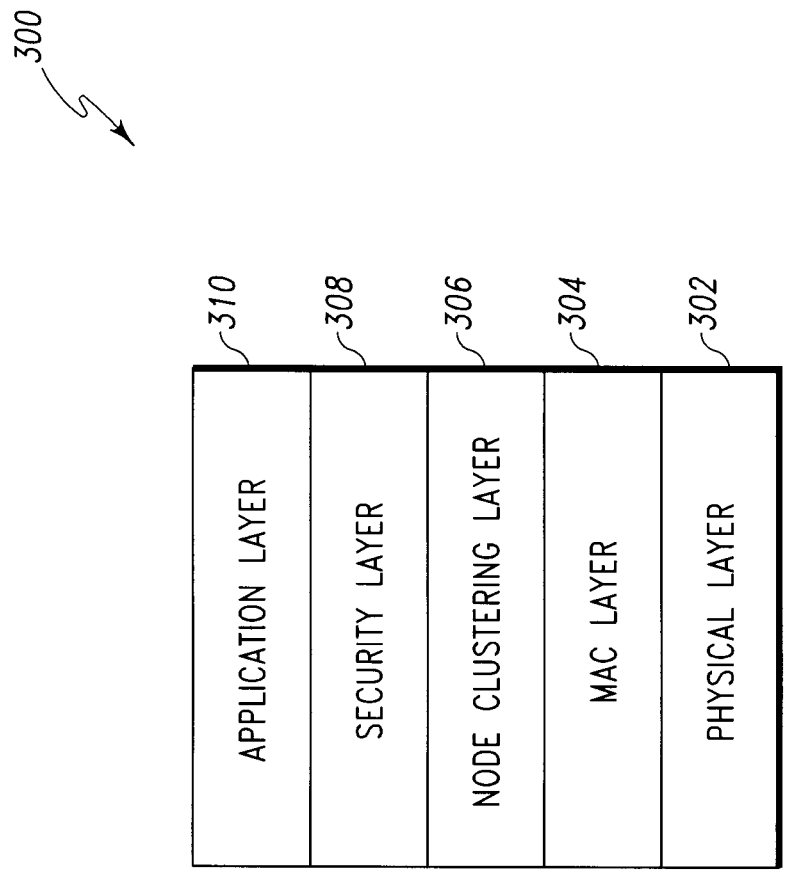
FIG. 20 is a graphical representation of a protocol stack for a wireless camera network.

A protocol stack for wireless camera networks based on the clustering protocol presented in this disclosure could be devised. An example of the protocol stack 300 to be employed in the wireless camera network is shown in FIG. 20. The physical layer 302 is illustratively the MicaZ motes. The stack also includes a media access control (MAC) layer 304 which provides for efficient operation of the node clustering layer 306 which provides for lower-level processing at a high efficiency. The media access control layer is illustratively a time division multiple access (TDMA) system. In other embodiments, the MAC layer 304 may be embodied as a carrier sense multiple access (CSMA) system or other MAC protocol specified for wireless networks.

Because wireless networks, by their nature, are susceptible to security breaches, an optional security layer 308, embodied as a secure sockets layer (SSL), may be included in some embodiments. Because secure communications are not a requirement for the protocol, the security layer 308 may be omitted in certain embodiments.

The protocol stack 300 also includes an application layer 310 embodied as a Distributed Kalman Filter for Object Tracking. The application layer 310 is provides for application-layer protocols related to target identification while the MAC layer 304 allows for lower-level protocols which allow the clustering protocol to operate more efficiently.

Simple objects are used in the illustrative embodiment. For such objects, detection is carried out by thresholding the color histogram of the object. Therefore, the list of object features consists simply of flags to indicate whether an object matches a given histogram. The histogram based segmentation algorithm yields a binary image of the target which is processed with a standard recursive labeling algorithm to compute the coordinates of the centroid of the target with respect to the image frame. The mote then receives the pixel coordinates from the attached camera via a serial interface and, based on the calibration parameters for the camera, computes the coordinates as well as the covariance matrix of the target location in the world reference plane. The mote also executes the clustering protocol and handles the associated communications.

During collaborative processing, cluster members share information about the state of the target. As the clusters propagate, this information is carried by the clusters so that it may be used by new cameras to improve the estimated state of the target. To implement this behavior, the cameras within a cluster share an object identifier that is defined simply by the numerical ID of the first camera that detects the target. This information is carried along by the clusters as they propagate during object tracking. Whenever this information is lost, for instance if cluster propagation fails and a new cluster is created to tract the object, the network loses previous information about the target and a new object identifier is created by the next camera that detects the object. This approach to maintaining cluster state can be extended to include additional parameters regarding the state of the object and its motion.

The diagrammatic representation of FIG. 13 corresponds to a graphical user interface (GUI) that was implemented to visualize the dynamic behavior of the network. At the point in time shown in FIG. 13, the 12 cameras 271-282 are shown on the display. The camera 276 represents a cluster head and cameras 272 and 275 connected to the cluster head by solid lines represent cluster members. The remaining cameras 271, 273, 274 and 277-282 represent cameras that do not belong to any cluster. Solid lines 295 and 297 represent the connections among cluster members and their respective cluster head. The dashed line 298 represents a connection that should have been established but was not due to a communication failure in the illustrative embodiment. The ellipses 284, 286 and 288 represent the 95% uncertainty region of the target object position with respect to each camera 272, 275, and 276 that can detect the target. The expected value of the target position is displayed at the left bottom of the screen. The large rectangles 290, 292, 294 and 296 correspond to pieces of furniture present in the room that are represented in the GUI to facilitate the visualization of the movement of the target.

The illustrative embodiment was implemented to evaluate the performance of the clustering protocol. The samples used a single target object placed in various locations within the test bed. The cluster formation protocol is initiated from a remote base station. After a cluster is formed, the cluster head sends a message to the base-station informing it of that fact. Based on the position of the target and the position of the cameras that participate in the election, the distance of the object center from the center of the image plane of the camera is computed. The distance information is used to manually rank the suitability of each of the cameras as a cluster head. The election head efficiency is then calculated by comparing the frequency with which the head election algorithm agrees with the manually calculated top ranked camera.

Figure 14:
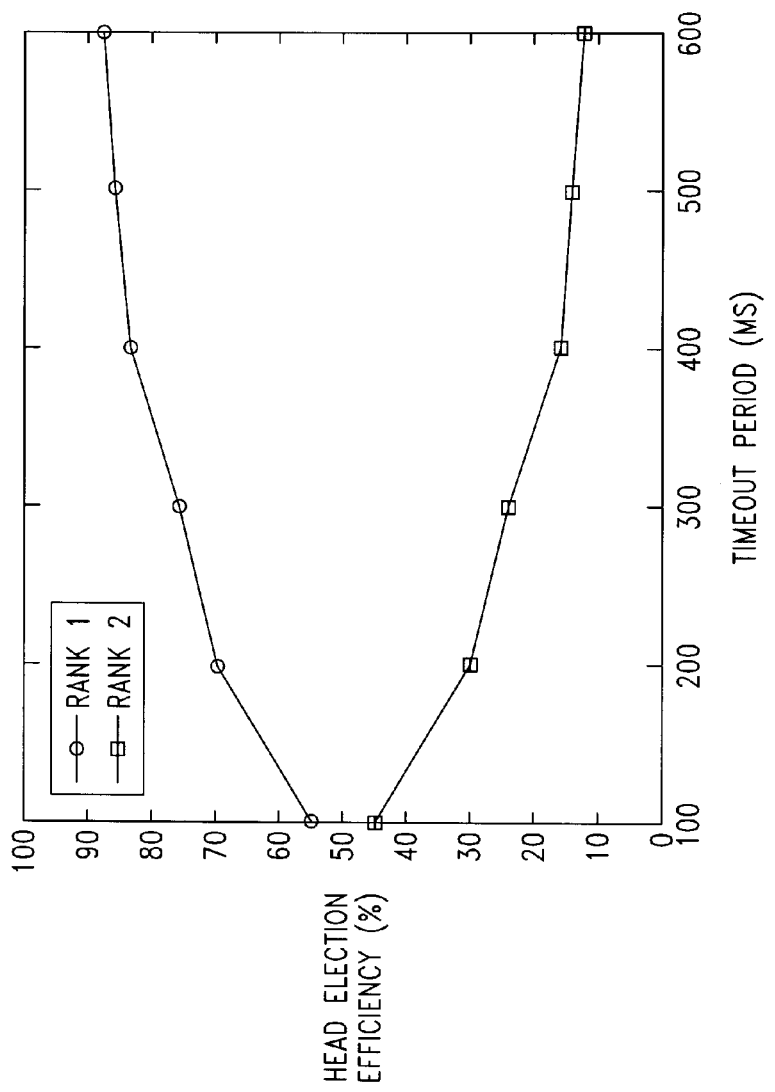
FIGS. 14-16 are graphical representations of the efficiency of election of cluster heads under various conditions.

In the illustrative implementation, 50 samples were run with a target positioned such that a cluster of 2 cameras should be formed with varying timeout periods. The cluster head efficiency for this experiment in shown in FIG. 14. In FIG. 14, the x-axis is timeout period and the y-axis shows the efficiency of cluster head election. The topmost ranked camera is shown as RANK 1 and the second camera is shown as RANK 2. As seen from FIG. 14, the topmost ranked camera was elected cluster head a majority of the time. In addition, the efficiency increased with an increased timeout period.

Figure 15:
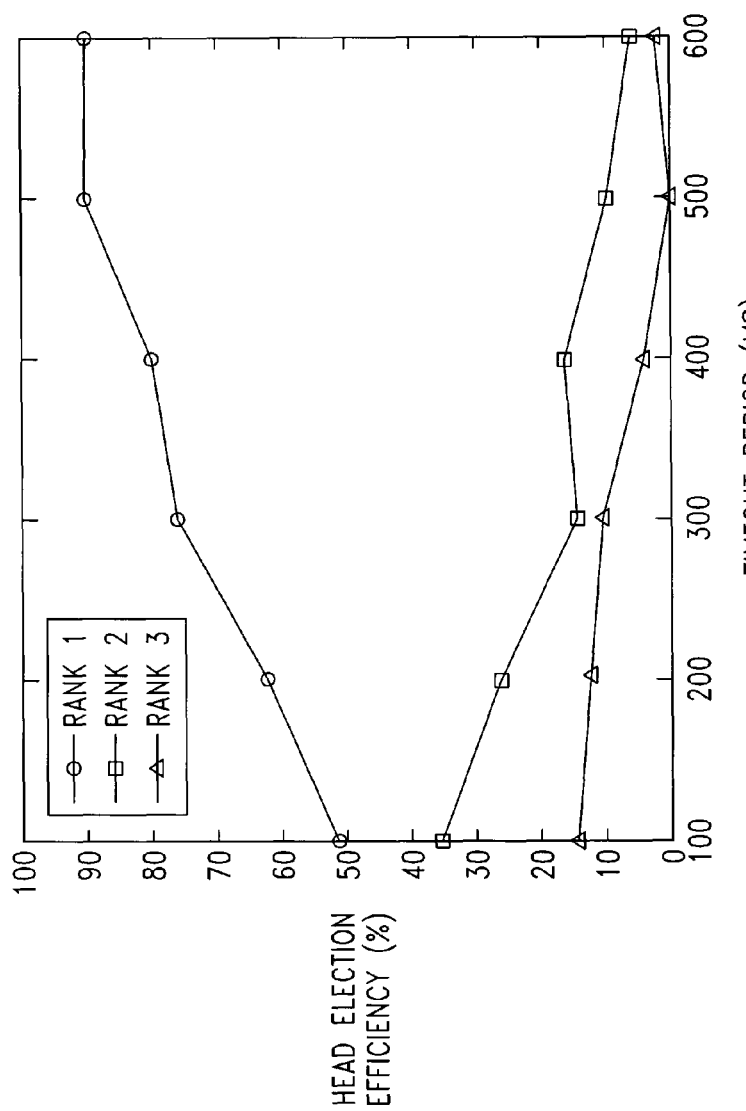
Figure 16:
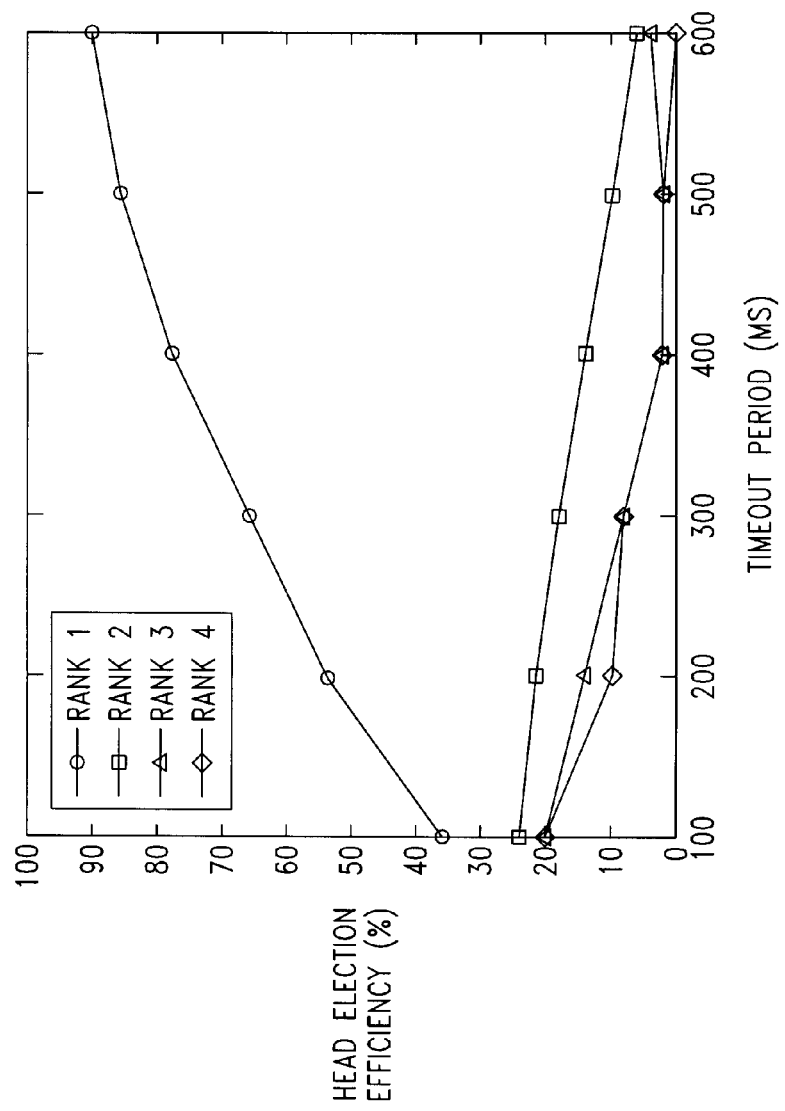

FIG. 15 is similar to FIG. 14, with FIG. 15 disclosing the cluster head election efficiency with a target positioned in a 3 camera cluster. FIG. 16 discloses the cluster head election efficiency with a target positioned in a 4 camera cluster. As can be seen in FIGS. 14-16, the disclosed algorithm has a cluster head election efficiency that approaches 90% at a timeout period of 600 milliseconds. In addition, it should be understood that while the topmost manually ranked cluster head is not always elected cluster head, the protocol is robust and operational with a lower ranked cluster head as well.

The failure to elect the correct cluster head has two main causes, communication failures and sampling delays. Communication failures occur which may cause a cluster ready message sent by a camera to be lost, thereby causing a camera to choose a less suitable head. The communication failures are mitigated by the cluster coalescence process described above.

Sampling delays cause the network to be asynchronous. A correct cluster head may not acquire an image of a target by the time a cluster is formed due to the sampling rate of the camera. In the illustrative embodiment disclosed herein, the sampling rate of the cameras is about 1 second. In the case when the timeout period is 100 milliseconds, a particular camera may not acquire the target before a cluster is formed. If the camera should be the cluster head, the neighboring cameras may already belong to a cluster. In the illustrative embodiment, as the timeout period approached the sampling rate of the cameras, the efficiency of the head election algorithm increased. Thus, in various applications, the head election efficiency is improved by either increasing the timeout period or reducing the sampling rate of the cameras.

It should be noted that communication failures and the asynchronous nature of the network also results in initial failures of cameras to join a cluster when they are positioned to be a part of the cluster. This phenomenon is mitigated by the cluster coalescence process described above as cameras acquire the target image and identify a cluster to join. Again, the performance may be improved by expanding the timeout period for cluster formation or reducing the sampling interval of the cameras.

Figure 17:
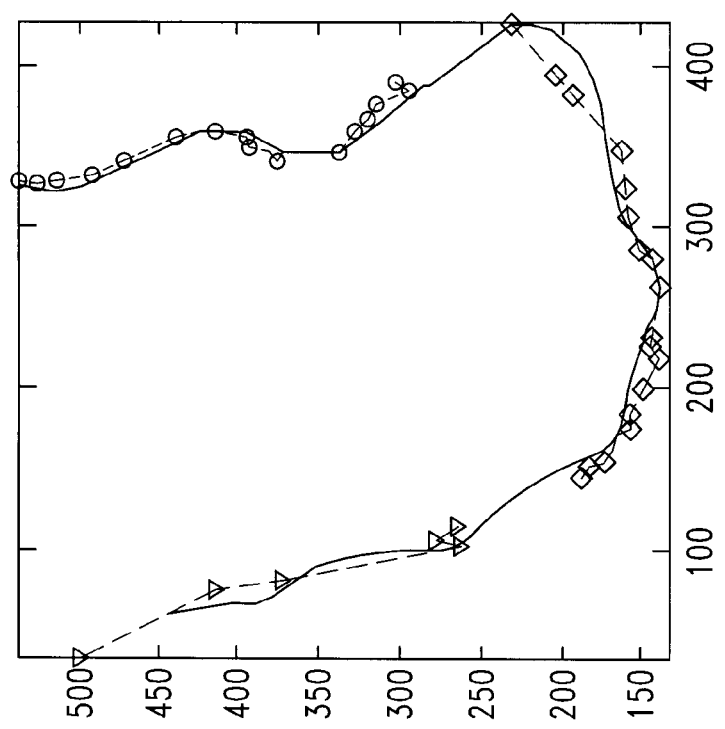
FIGS. 17-19 are graphical representations of the tracking efficiency of a system of sensors for tracking a target object.
Figure 18:
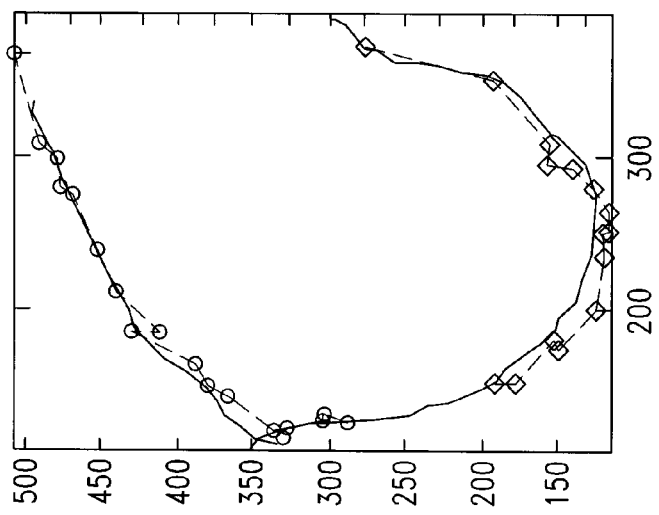
Figure 19:
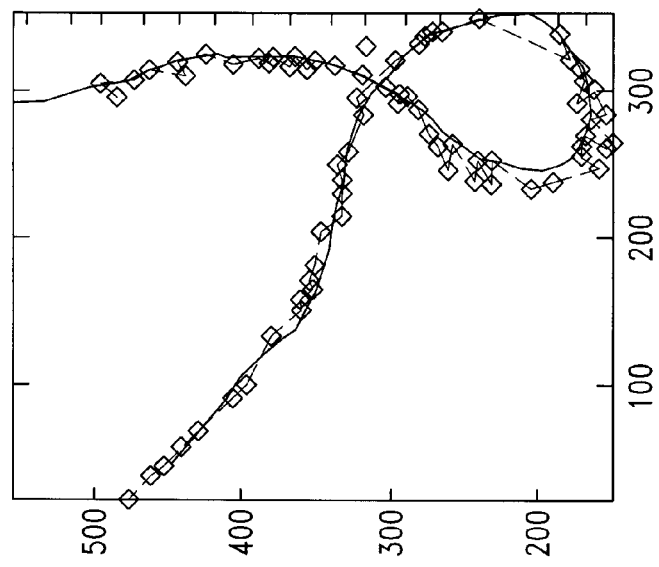

The tracking performance of the system was also evaluated through an implementation of the illustrative embodiment. An object was moved randomly and the actual position was monitored using a firewire camera at 30 frames per second. Three runs of the implementation are shown graphically in FIGS. 17-19. The axes represent distances in two dimensions over the floor. The solid line in each graph represents the actual path of movement of the target object. The dashed line shows the trajectory of the target as computed by the system. The changes in marker shape illustrate moments when the system has lost track of the object and a new object identifier is created. This occurs when the cluster propagation fails and a new cluster is created to track the target object.

Although certain illustrative embodiments have been described in detail above, variations and modifications exist within the scope and spirit of this disclosure as described and as defined in the following claims.

The invention claimed is:

1. A method of tracking target objects in a network of unidirectional sensors which correspond to nodes on the network, the method comprising
    identifying the presence of a target object by a first unidirectional sensor,
    determining a first value for the relationship of the target object to the first unidirectional sensor,
    sending a message to at least one second unidirectional sensor which is a neighbor to the first unidirectional sensor, the message including a unique identification of the target object and the first value,
    monitoring messages from at least one second unidirectional sensor sending a second value indicative of the relationship of the target object to the at least one second unidirectional sensor,
    ranking the first value and second value, if available, and the first unidirectional sensor utilizing the ranking of the first and second criterion to determine
    whether to elect itself the head of a cluster including at least the first unidirectional sensor or join a cluster headed by a second unidirectional sensor, and
    propagating the cluster by dropping a sensor from the cluster when the target object gets out of the sight of the sensor.

2. The method of claim 1, wherein the step of propagating the cluster through the network of sensors further comprises adding an additional sensor which is a sensor in single hop communication with the current cluster head to the cluster upon identification of the target object by the additional sensor.

3. The method of claim 1, further comprising dissolving the cluster when the cluster head loses contact with the target object.

4. The method of claim 1, wherein a new cluster head is reassigned when the cluster head loses contact with the target object.

5. The method of claim 1, wherein when the cluster head loses contact with the target object, other cluster members form at least one new cluster through single hop communication between the other cluster members excluding the cluster head.

6. The method of claim 1, wherein the ranking is based on a criterion which is a distance between the camera-center of the unidirectional sensors and the object center in the image plane.

7. The method of claim 3, wherein the step of propagating the cluster through the network further comprises fragmenting a first cluster into multiple clusters when the cluster head of the first cluster loses contact with the target object.

8. The method of claim 7, wherein the step of identifying a target object comprises identifying a unique characteristic of an object in the range of the sensor.

9. The method of claim 8, wherein the sensors are cameras.

10. The method of claim 8, wherein the sending of a message comprises broadcasting a message to all neighboring sensors.

11. The method of claim 9, wherein the sensors are cameras and the unique characteristic of the object is a color histogram.

12. A system for tracking a target object, the system comprising
a plurality of unidirectional sensors,
a plurality of communication devices, each communication device associated with a respective unidirectional sensor, the plurality of communication devices configured to form a distributed network, and
a control system configured to (i) receive information from one or more of the unidirectional sensors, (ii) process the information from the one or more unidirectional sensors to identify a characteristic of a target object, (iii) determine a first value for the relationship of the target object to a first unidirectional sensor, (iv) send a message including a unique identification of the target value and the first value to at least one second unidirectional sensor that is a neighbor to the first unidirectional sensor, (v) monitor messages from the at least one second unidirectional sensor including a second value indicative of the relationship of the target object to the at least one second unidirectional sensor, (vi) rank the first value and second value, (vii) determine whether to elect the first unidirectional sensor the head of a cluster of sensors or to have the first unidirectional sensor join a cluster headed by the at least one second unidirectional sensor based on the ranking, (viii) propagate the resulting cluster by dropping a sensor from the cluster when the target object gets of the sight of the sensor.

13. The system of claim 12, wherein the control system is further configured to form a plurality of clusters of unidirectional sensors positioned to sense the target object, each cluster sharing data from each of the sensors in the cluster to monitor the position of the target object, and propagate at least one of the plurality of clusters by adding an additional unidirectional sensor to the cluster when the control system determines that the additional unidirectional sensor is in single hop communication with a cluster head and has indentified the target object.

14. The system of claim 12, wherein the communication devices communicate wirelessly.

15. The system of claim 13, wherein a first communication device sends a broadcast message to all of the communication devices in single hop communication with the first communication device when the sensor associated with the first communication device detects a target object, the broadcast message including (i) information regarding an identifying characteristic of the target object and (ii) a value indicative of the position of the target object relative to the sensor associated with the first communication device.

16. The system of claim 15, wherein the ranking determines that a first unidirectional sensor identified as having a position in the first sensor sensing area closest to the target object relative to the unidirectional sensors having communication devices in single hop communication with the communication device associated with the first unidirectional sensor is designated the head of a cluster of sensors.

17. The system of claim 15, wherein the plurality of clusters share information regarding the position of the target object, each cluster sharing information with an adjacent cluster through communication devices of each cluster which each border each other such that the communication devices are in single hop communication.

18. The system of claim 16, wherein the plurality of clusters share information regarding the position of the target object, each cluster sharing information with an adjacent cluster through communication devices of each cluster which each border each other such that the communication devices are in single hop communication.

19. A method of tracking target objects in a network of unidirectional sensors which correspond to nodes on the network, the method comprising identifying the presence of a target object by a first unidirectional sensor,
determining a first criterion for the relationship of the target object to the first unidirectional sensor,
sending a message to at least one second unidirectional sensor which is a neighbor to the first unidirectional sensor, the message including a unique identification of the target object and the first criterion,
monitoring messages from at least one second unidirectional sensor sending a second criterion indicative of the relationship of the target object to the at least one second unidirectional sensor,
ranking the first criterion and second criterion, if available, and
the first unidirectional sensor utilizing the ranking of the first and second criterion to determine whether to elect itself the head of a cluster including at least the first unidirectional sensor or join a cluster headed by a second unidirectional sensor, and
wherein the unidirectional sensors are consisted of cameras and the criterion is a distance between an image plane center and the target objects' center captured image by the first or second unidirectional sensor in the image plane of the camera,
further comprising propagating the cluster through the network further comprises dropping a sensor from the cluster when the target object gets out of the sight of the sensor.

* * * * *